United States Patent [19]

Benjamin et al.

[11] 4,194,813
[45] Mar. 25, 1980

[54] VACUUM APERTURE ISOLATOR FOR RETROREFLECTION FROM LASER-IRRADIATED TARGET

[75] Inventors: Robert F. Benjamin; Kenneth B. Mitchell, both of Los Alamos, N. Mex.

[73] Assignee: The United States of America as represented by the United States Department of Energy, Washington, D.C.

[21] Appl. No.: 951,203

[22] Filed: Oct. 13, 1978

[51] Int. Cl.² .............................................. G02F 1/00
[52] U.S. Cl. ............................... 350/363; 331/94.5 Q; 331/94.5 C; 350/320
[58] Field of Search ................. 350/17, 319, 363, 285, 350/320; 331/94.5 Q

[56] References Cited

U.S. PATENT DOCUMENTS

| | | | |
|---|---|---|---|
| 3,433,555 | 3/1969 | Tomlinson | 350/363 |
| 3,718,592 | 2/1973 | Prosser | 350/363 |
| 3,734,592 | 5/1973 | Sztankay et al. | 350/17 |
| 3,814,503 | 6/1974 | Milam | 350/363 |
| 3,980,397 | 9/1976 | Judd et al. | 350/162 R |

*Primary Examiner*—Jon W. Henry
*Attorney, Agent, or Firm*—R. V. Lupo; Paul D. Gaetjens; Robert W. Weig

[57] ABSTRACT

The disclosure is directed to a vacuum aperture isolator for retroreflection of a laser-irradiated target. Within a vacuum chamber are disposed a beam focusing element, a disc having an aperture and a recollimating element. The edge of the focused beam impinges on the edge of the aperture to produce a plasma which refracts any retroreflected light from the laser's target.

5 Claims, 1 Drawing Figure

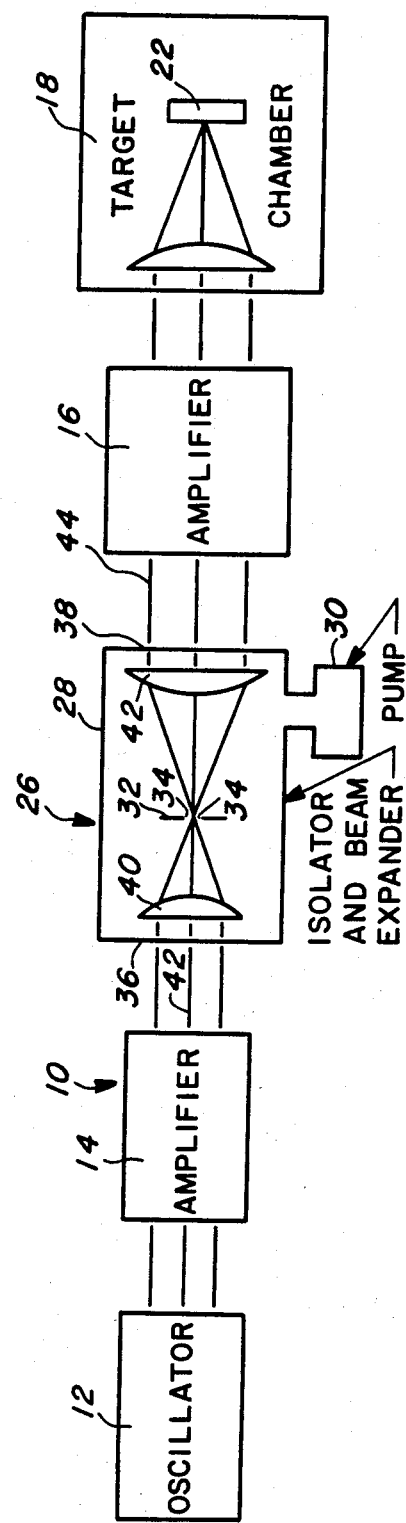

VACUUM APERTURE ISOLATOR FOR RETROREFLECTION FROM LASER-IRRADIATED TARGET

FIELD OF THE INVENTION

The invention relates to apparatus and method for eliminating retropulse damage to a laser and more particularly, it relates to a plasma producing, light refracting, retropulse isolator.

BACKGROUND OF THE INVENTION

A major problem confronting the use of medium energy and high energy lasers is isolation between the laser and the target. When an incident laser beam interacts with a target, a portion of the laser energy retroflects back toward the laser. This retropulse will be amplified if the amplifiers are still in the excited state. The amplified retropulse may then damage optical components near the front end of the laser chain,, notably the oscillator and pulse-switchout device. At optical and near infrared wavelengths, Faraday rotators are often used as isolators. However, at the $CO_2$ laser wavelength, 10.6 $\mu$m, Faraday rotators providing requisite extinction are not currently available.

Several devices and methods have been tried in order to isolate a $CO_2$ laser from its target's retroreflection. Usually these involve a formation of a plasma discharge in air. The plasma reflects, refracts, scatters and absorbs laser light, to prevent transmission. One method involves the breakdown of a thin Mylar foil (Mylar is a trademark of the E. I. DuPont DeNemours and Company, a highly durable, transparent, water-repellent film of polyethylene terephthalate resin) by the laser pulse itself or by an auxiliary laser beam. Another utilizes air breakdown near a focal spot, with a reflector to concentrate the energy of the beam's fringe into the center. In this method, the beam's electric field exceeds the breakdown threshold in air. Elsewhere, air breakdowns are produced by applying an overvoltage pulse to a small region to cause a spark, the pulse being synchronized with the laser beam.

SUMMARY OF THE INVENTION

In accordance with the present invention, there is provided an apparatus and method for inhibiting retroreflection in a laser to eliminate retropulse damage to optical components of the laser. A vacuum chamber having windows transparent to radiation of the utilized frequency is disposed so that the beam path passes through the chamber. An aperture containing disc, such as one comprising aluminum or tantalum, is disposed in the chamber between focusing and recollimating elements. The aperture is situated approximately at the focus of the focusing element on the beam path and is of such size that the focused beam passing through it slightly impinges on the edges of the aperture to produce a plasma which refracts light retroreflected from the target of the laser, thereby prohibiting its reentrance into the laser.

BRIEF DESCRIPTION OF THE DRAWING

Several objects and advantages of the present invention will be apparent to those skilled in the art from the following description with reference to the appended drawing wherein like numbers denote like parts and wherein:

The FIGURE schematically shows a laser utilizing a preferred embodiment of the invention.

DETAILED DESCRIPTION OF A PREFERRED EMBODIMENT OF THE INVENTION

The isolating structure and method described herein utilize a plasma created in vacuum. The plasma is initiated by the laser pulse itself, thereby assuring no jitter problem. The structure comprises a spatial filter configuration such as a focusing element, a disc having a pinhole aperture, and a recollimating element disposed within a vacuum chamber. This aperture is of such size that the laser beam damages its edges to initiate a plasma which then propagates radially inwardly toward the center of the aperture. This plasma attenuates the transmission of laser light and remains at a sufficiently high density long enough to attenuate a retropulse from the laser's target. The preferred embodiment described herein is operable at wavelengths at which Faraday rotators and other isolator devices are ineffective or not available.

As seen in the FIGURE, a typical laser 10 utilizing the isolator structure of the invention may comprise an oscillator 12, a first amplifier 14, a second amplifier 16, and a target chamber 18 including a beam focusing lengs 20 and a target 22. Disposed between amplifier 14 and 16 is an isolator structure 26 comprising the preferred embodiment of the invention. A vacuum chamber 28 having a pump 30 attached thereto has disposed therein a disc 32 containing an aperture having edges 34. The collimated laser beam passes into the chamber through a first transparent wall 36 and out through a second transparent wall 38. Transparency is defined as passing all or substantially all radiation of a selected wavelength. Material transparent to radiation of one wavelength may or may not be transparent to radiation of another wavelength. The windows 36 and 38 and the chamber are transparent to radiation of the wavelength produced by the laser 10. A focusing element 40 focuses the collimated radiation from beam 42 on the pinhole aperture having edges 34 so that the light just touches the edges sufficiently to produce the amount of plasma desired. A recollimating element 42 recollimates the beam into parallel light 44 which passes into amplifier 16.

It will be appreciated by those skilled in the art that the isolator 26 may be disposed between target chamber 18 and final amplifier 16, between amplifiers 14 and 16 as seen in the FIGURE, or between oscillator 12 and amplifier 14. In all of these configurations, the isolator will operate effectively.

It will also be apparent to those skilled in the art that an additional laser beam may be utilized to provide aperture edge plasma production and the main laser beam passing through the pinhole may be smaller than the aperture. Too, the retroreflected laser pulse itself may be utilized to generate the plasma which will refract it.

It is preferable that the vacuum be at a pressure below $10^{-5}$ torr. It has been found that aluminum and tantalum on the order from about 1 to about 5 mils thick having pinhole aperture sizes on the order of 150-400 $\mu$m provide adequate discs 32.

In an experiment, the isolator was tested utilizing a visible laser pulse to simulate a retroreflected $CO_2$ pulse. This test was even more stringent than using an isolator in retroreflecting light from a target because the visible beam utilized, i.e., 0.515 $\mu$m wavelength from an Ar+ ion laser interacts most strongly with the plasma near its critical density of $4 \times 10^{21}/cm^3$ whereas 10.6 $\mu$m $CO_2$ radiation interacts with a $10^{19}/cm^3$ plasma. For example, if the $CO_2$ beam incident on the aperture and vacuum creates a plasma of $10^{20}/cm^3$, then the 0.515 $\mu$m beam will be transmitted while a 10.6 $\mu$m beam would be blocked. Thus, attenuation of the 0.515 $\mu$m beam is sufficient, to show that a plasma strongly attenuates 10.6 $\mu$m light.

In tests, the incident 10.6 $\mu$m beam energy was 0.5 to 0.9 J and the aperture diameter ranged from 100-250 $\mu$m. Alignment of the $CO_2$ beam in the aperture was performed using a pyroelectric vidicon to detect 10.6 $\mu$m light transmitted through the aperture. The alignment procedure was carried out using laser energy too small to damage the pinhole. Following alignment, the laser pulse having 0.5 to 0.9 J energy was fired. It was observed that the $CO_2$ beam transmitted through the aperture was extinguished during the 1.5 ns FWHH pulse and that the 0.5 $\mu$m beam passing through the aperture was also extinguised. An important result was that the transmitted 0.5 $\mu$m beam remained off for at least 25 ns following the $CO_2$ pulse. This implies that the device remains active as an isolator for at least that length of time.

Those skilled in the art will realize that the plasma produced may also be utilized as a pulse shortener. Another application is using a time histoy of the transmitted pulse to assess the effect of the radiation pressure of the $CO_2$ pulse, i.e., the ponderomotive force on the plasma created at the pinhole's edge.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What we claim is:

1. A structure for inhibiting retroreflection in a laser system to eliminate retropulse damage to optical components of said system, said structure comprising:
   a vacuum chamber having elements transparent to radiation of the frequency to be utilized disposed at either end of a laser beam path through said chamber;
   an aperture containing disc disposed in said chamber with the aperture thereof being on said beam path;
   means for converging light from a laser beam traveling said beam path onto said aperture, said aperture being just sufficiently small that the beam damages its edges, thereby creating a plasma for refracting any retroreflected radiation from a laser target away from the beam path; and
   means for recollimating the portion of the beam passing through said aperture.

2. The invention of claim 1 wherein said disc comprises material selected from the group consisting of aluminum and tantalum.

3. The invention of claim 2 wherein said disc is between about one mil and five mils in thickness.

4. The invention of claim 3 wherein said aperture is between about 150 and 400 $\mu$m in diameter.

5. A method of preventing retroreflection of an incident laser beam from a target back into the laser comprising the steps of:
   within the laser system, focusing the beam through an aperture in a disc, the outer edge of the beam impinging on the edge of the aperture enough to produce sufficient plasma to effectively refract any retroreflected light from the target out of the beam path, and recollimating the focused beam.

* * * * *